Figure 1:
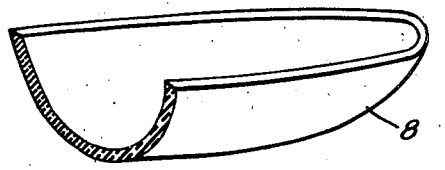

W. H. KEMPTON.
METHOD OF FORMING COMPOSITE PLATES.
APPLICATION FILED JAN. 8, 1919.

1,312,789.

Patented Aug. 12, 1919.

WITNESSES:
H. J. Shelhamer
W. H. Woodman.

INVENTOR
Willard H. Kempton
BY
Wesley G. Carr
ATTORNEY

UNITED STATES PATENT OFFICE.

WILLARD H. KEMPTON, OF WILKINSBURG, PENNSYLVANIA, ASSIGNOR TO WESTINGHOUSE ELECTRIC & MANUFACTURING COMPANY, A CORPORATION OF PENNSYLVANIA.

METHOD OF FORMING COMPOSITE PLATES.

1,312,789.  Specification of Letters Patent.  Patented Aug. 12, 1919.

Application filed January 8, 1919. Serial No. 270,139.

*To all whom it may concern:*

Be it known that I, WILLARD H. KEMPTON, a citizen of the United States, and a resident of Wilkinsburg, in the county of Allegheny and State of Pennsylvania, have invented a new and useful Improvement in Methods of Forming Composite Plates, of which the following is a specification.

My invention relates to methods of molding composite bodies and more particularly plates or compound sheets comprising superimposed layers of fibrous sheet material impregnated with a binder which may be hardened by proper curing.

Heretofore, plates of such character have been molded by compressing them between platens in a suitable press, ordinarily with an application of heat to harden the binder during the pressing operation. It has been found, however, that, if curved plates of large superficial area and small thickness are to be made, this method can not be followed in a practical manner. This is partly due to the fact that it is very expensive to machine a pair of platens for molding curved plates with such accuracy as to insure uniform thickness of the formed plate and consequent uniform quality. Furthermore, even if the plates are machined accurately, the warping of the plates which will occur, on account of the necessary heating and cooling of the platens, during the molding operation, will distort them to such degree as to cause variations in the thickness of the finished plate.

Owing to lack of pressure against them during molding, the thick portions of the finished plate are weak and poorly finished.

In view of these facts, the primary object of my present invention consists in the provision of a method for molding plates, of this character, which will overcome the foregoing difficulties.

With these and other objects in view, my invention will be more fully described, illustrated in the drawings, in the several views of which corresponding numerals indicate like parts, and then particularly pointed out in the claims.

Figure 2:
Figure 3:
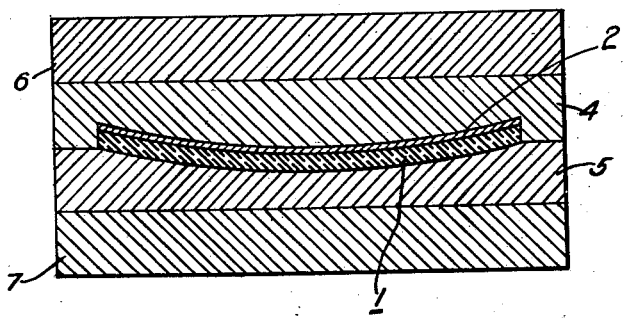

Figure 1 is a perspective view of an article which may be formed by practising my invention; Fig. 2 is a sectional view of an unmolded plate, together with an equalizing sheet employed by my method, prior to their being placed between pressure-applying platens, and Fig. 3 is a sectional view taken through a pair of pressure-applying platens, the interposed plate to be molded and its equalizing sheet.

In practising my invention, I form a compound sheet or plate, of the desired thickness, by superimposing layers of fibrous sheet material, such as paper, woven fabrics or cotton batting, impregnated with any suitable binder as, for example, a phenolic condensation product. By the methods previously followed, the plate so assembled was interposed between polished, oiled platens of suitable shape and there subjected to sufficient heat and pressure to compact it and harden its binder. This, however, if the sheet or plate to be formed was to have a considerable superficial area and be curved, would not give uniform results, as the platens would warp, under changes in temperature necessitated by the curing, and thus cause inequalities in the thickness of the plate. Furthermore, if the platens were so accurately machined as to insure uniformity, aside from the slight variations caused by warping, they were so expensive as to render the cost of manufacture of such articles prohibitive.

By utilizing my method, the above noted objections are overcome by the employment of an equalizing sheet, of semi-plastic material, disposed between the plate to be molded and one of the platens and capable, under the pressure employed, of flowing from a point of high pressure to a point of low pressure during the molding, so as to equalize inequalities between the two molding plates or platens.

In Fig. 2 of the drawings, I have illustrated, upon a reduced scale, a plate-forming stack 1 comprising superimposed layers 2 of fibrous sheet material, impregnated with a binder, and an equalizing sheet 3 of a semi-plastic material, such as lead, as they appear prior to molding.

The plate-forming stack and the equalizing sheet may be positioned between properly shaped or curved platens 4 and 5 and disposed in a press, the press-plates of which are indicated at 6 and 7. The press may then be actuated to force the platens toward each other and to strongly compress the stack, heat being applied, in the meantime, to harden the binder employed. After the binder has been fully hardened, the platens may be cooled in any suitable manner, the press may be opened and the platens may be removed and separated and the finished plate taken out.

During the molding of the plate, any inequalities in the platens are equalized by flow of the lead sheet from points of high pressure to those of low pressure, so that a plate of uniform thickness throughout is assured. The thickness of the lead plate will, of course, vary in proportion to the extent of the irregularities in the platens but need not, as a rule, be great. Of course, as is usual, the platens are polished and oiled and, as a result, a polished surface upon that side of the completed plate which is engaged by a platen is insured.

Obviously, this method may be employed while molding plates and other articles of various characters and shapes. For instance, in Fig. 1, I have shown a hollow body 8 which may be readily molded by the method above disclosed. Inasmuch, also, as semi-plastic materials other than lead may be employed, and various molding compositions may be utilized for forming the plates or other bodies being made, changes may be made in my method of molding. For this reason, no limitations are to be imposed upon my invention, other than those set forth in the claims.

I claim as my invention:

1. The method of overcoming irregularities in mold platens which comprises interposing a pressure-equalizing body between one of the platens and the article being molded to equalize the applied pressure.

2. The method of overcoming irregularities in mold platens which comprises interposing a pressure-equalizing body of semi-plastic material between one of the platens and the article being molded to equalize the applied pressure.

3. The method of overcoming irregularities in mold platens which comprises interposing a pressure-equalizing sheet of lead between one of the platens and the article being molded to equalize the applied pressure.

4. The method of molding a thin plate of fibrous material and a binder which comprises subjecting it, together with a pressure equalizing sheet, to heat and pressure between platens.

5. The method of molding a thin plate of fibrous material and a binder which comprises subjecting it, together with a pressure-equalizing sheet of semi-plastic material, to heat and pressure between platens.

6. The method of molding a thin plate of fibrous material and a binder which comprises subjecting it, together with a pressure-equalizing sheet of lead, to heat and pressure between platens.

7. The method of molding a thin plate of superimposed layers of fibrous material, associated with a phenolic condensation product as a binder, which comprises disposing the assembled layers, together with an equalizing sheet, between platens and applying heat and pressure to compact the plate and harden its binder.

8. The method of molding a thin plate of superimposed layers of fibrous material associated with a phenolic condensation product as a binder which comprises disposing the assembled layers, together with an equalizing sheet of material which will flow, under pressure, between platens and applying heat and pressure to compact the plate and harden its binder.

9. The method of molding a thin plate of superimposed layers of fibrous material associated with a phenolic condensation product as a binder which comprises disposing the assembled layers, together with an equalizing sheet of semi-plastic material, between platens and applying heat and pressure to compact the plate and harden its binder.

10. The method of molding a thin plate of superimposed layers of fibrous material associated with a phenolic condensation product as a binder which comprises disposing the assembled layers, together with an equalizing sheet of lead, between platens and applying heat and pressure to compact the plate and harden its binder.

In testimony whereof, I have hereunto subscribed my name this 24th day of Dec., 1918.

WILLARD H. KEMPTON.